United States Patent
Lissianski et al.

(10) Patent No.: US 9,957,888 B2
(45) Date of Patent: May 1, 2018

(54) SYSTEM FOR GENERATING SYNGAS AND AN ASSOCIATED METHOD THEREOF

(71) Applicant: General Electric Company, Schenectady, NY (US)

(72) Inventors: Vitali Victor Lissianski, Schenectady, NY (US); Sergey Anatolievich Meshkov, Moscow (RU); Mathilde Bieber, Munich (DE); Vitaly Vladimirovich Kuzminov, Moscow (RU)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 206 days.

(21) Appl. No.: 15/085,409

(22) Filed: Mar. 30, 2016

(65) Prior Publication Data

US 2017/0284295 A1    Oct. 5, 2017

(51) Int. Cl.
*F02C 3/30* (2006.01)
*F02C 3/34* (2006.01)

(52) U.S. Cl.
CPC .    *F02C 3/30* (2013.01); *F02C 3/34* (2013.01)

(58) Field of Classification Search
CPC combination set(s) only.
See application file for complete search history.

(56) References Cited

U.S. PATENT DOCUMENTS

| | | |
|---|---|---|
| 2,605,175 A | 7/1952 | Barber |
| 2,909,416 A | 10/1959 | Herwig |
| 3,687,866 A | 8/1972 | Sadee et al. |
| 3,808,805 A * | 5/1974 | Miramontes C. ....... F01N 3/005 60/274 |
| 3,969,899 A * | 7/1976 | Nakazawa ............... F02B 47/06 110/206 |
| 5,327,874 A * | 7/1994 | Pugachev ............... F02B 43/08 123/545 |

(Continued)

FOREIGN PATENT DOCUMENTS

| | | |
|---|---|---|
| CN | 1521446 A | 8/2004 |
| GB | 793383 A | 4/1958 |

(Continued)

OTHER PUBLICATIONS

Cormier et al., "Syngas production via methane steam reforming with oxygen: plasma reactors versus chemical reactors", Journal of Physics D: Applied Physics, vol. 34, Issue: 18, Sep. 21, 2001, pp. 2798-2803.

(Continued)

*Primary Examiner* — Kaity Chandler
(74) *Attorney, Agent, or Firm* — John P. Darling

(57) ABSTRACT

A system and method for generating an exhaust syngas are disclosed. The system includes a mixing unit, a heat exchanger, and an engine. The mixing unit is configured to mix a hydrocarbon fuel, an oxidant, and water to generate a fuel mixture. The heat exchanger is coupled to the mixing unit and is configured to receive the fuel mixture from the mixing unit, evaporate the water by heating the fuel mixture using a hot fluid, and generate a heated fuel mixture. The engine is coupled to the heat exchanger and is configured to receive the heated fuel mixture from the heat exchanger and generate an exhaust syngas by partially combusting the heated fuel mixture.

9 Claims, 6 Drawing Sheets

(56) References Cited

U.S. PATENT DOCUMENTS

| | | | |
|---|---|---|---|
| 6,174,460 B1 | 1/2001 | Grunvald et al. | |
| 6,314,919 B1* | 11/2001 | Pugachev | F02M 23/02 123/3 |
| 7,478,628 B2* | 1/2009 | Hines | F02D 41/003 123/557 |
| 7,765,794 B2* | 8/2010 | Alexander | C09K 8/92 60/274 |
| 8,109,078 B2 | 2/2012 | Johannes et al. | |
| 2006/0042245 A1* | 3/2006 | Wimmer | F01D 9/026 60/605.2 |
| 2008/0202121 A1* | 8/2008 | Nagel | F01K 21/04 60/670 |
| 2010/0307431 A1* | 12/2010 | Buchanan | F01B 21/00 123/3 |
| 2011/0251743 A1* | 10/2011 | Hu | B60K 6/24 701/22 |
| 2014/0119967 A1* | 5/2014 | Feustel | F04C 2/082 418/1 |
| 2014/0144397 A1 | 5/2014 | Bromberg, III et al. | |
| 2014/0216011 A1* | 8/2014 | Muthaiah | F02C 3/34 60/274 |
| 2015/0075162 A1* | 3/2015 | Yoshioka | F02M 26/06 60/605.2 |

FOREIGN PATENT DOCUMENTS

| | | |
|---|---|---|
| GB | 1086715 A | 10/1967 |
| WO | 2007094702 A1 | 8/2007 |
| WO | 2008106722 A1 | 9/2008 |
| WO | 2009154512 A2 | 12/2009 |

OTHER PUBLICATIONS

McMillian et al., "Experimental and modeling study of hydrogen/syngas production and particulate emissions from a natural gas-fueled partial oxidation engine", International Journal of Hydrogen Energy, vol. 31, Issue: 7, pp. 847-860, Jun. 2006.

Martínez et al., "Syngas production in downdraft biomass gasifiers and its application using internal combustion engines", Renewable Energy, vol. 38, Issue: 1, pp. 1-9, Feb. 2012.

Hegner et al., "HCCI Piston Engines for Polygeneration Comparing Single Zone to Multi Zone Models", retrieved from "http://homepages.vub.ac.be/~fcontino/jde2014/oral_presentations/hegner.pdf" retrieved Sep. 22, 2014.

Robert Hegner, "HCCI Piston Engines for Polygeneration Comparing Single-Zone to Multi-Zone Models" May 27, 2014, retrieved from "http://homepages.vub.ac.be/~fcontino/jde2014/oral_presentations/hegner_pres.pdf" on Sep. 22, 2014.

* cited by examiner

__(1)__

SYSTEM FOR GENERATING SYNGAS AND AN ASSOCIATED METHOD THEREOF

BACKGROUND

Embodiments of the present invention relate to a fuel conversion system, and more particularly to a syngas production system used in such fuel conversion system.

With gradual depletion of natural resources (fuels), for example, natural gas, there is greater emphasis on using such fuels more wisely or to effectively convert such fuels into alternative fuels. For example, syngas production systems are used to produce a gas stream containing hydrogen and carbon monoxide (hereinafter also referred as "syngas") from conventional fuels such as natural gas, coal, and biomass. The syngas production systems may include gasifiers, steam reformers, and the like. A converter system may be used to convert the syngas into liquid fuels such as gasolines, diesels, and the like. The converter system generally employs a set of chemical reactions for converting the syngas into the liquid fuels. However, a conventionally used syngas production system and the corresponding process are not very cost efficient for a small scale production. In the conventional syngas production system, for example, the steam reformer uses high temperature and pressure steam to convert methane to syngas. In such a system, an excess quantity of steam is used to improve efficiency of converting methane to syngas. Further, such a process requires catalysts for converting methane to syngas. The catalysts need to be periodically replaced. As a result, a syngas production system may become a capital intense component for the small scale production.

Accordingly, there is a need for an improved syngas production system and an associated method for generating syngas.

BRIEF DESCRIPTION

In accordance with one exemplary embodiment, a system for generating a syngas is disclosed. The system includes a mixing unit, a heat exchanger, and an engine. The mixing unit is configured to mix a hydrocarbon fuel, an oxidant, and water to generate a fuel mixture. The heat exchanger is coupled to the mixing unit and configured to receive the fuel mixture from the mixing unit, evaporate the water by heating the fuel mixture, using a hot fluid, and generate a heated fuel mixture. The engine is coupled to the heat exchanger and configured to receive the heated fuel mixture from the heat exchanger and generate an exhaust syngas by partially combusting the heated fuel mixture.

In accordance with one exemplary embodiment, a method for generating an exhaust syngas is disclosed. The method involves mixing a hydrocarbon fuel, an oxidant, and water in a mixing unit, to generate a fuel mixture. The method further includes receiving the fuel mixture from the mixing unit in a heat exchanger and evaporating the water by heating the fuel mixture, using a hot fluid, in the heat exchanger, to generate a heated fuel mixture. The method further includes receiving the fuel mixture from the heat exchanger in an engine and generating an exhaust syngas by partially combusting the heated fuel mixture in the engine.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments discussed herein disclose a system, for example, a fuel conversion system including a syngas production system and a catalytic converter. In such embodiments, the syngas production system is configured to generate a syngas from fuels such as natural gas and simulated air. In certain embodiments, the natural gas is a hydrocarbon fuel such as methane and the like. The term "simulated air" refers to a mixture of oxidant ($O_2$) and steam. In certain embodiments, the simulated air may additionally include nitrogen. The catalytic converter is configured to convert the syngas into a liquid fuel such as gasoline, diesel, methanol, and the like. In certain exemplary embodiments, the syngas production system is configured to mix the natural gas, oxidant, and water in a mixing unit to generate a fuel mixture. The fuel mixture is heated using a heat exchanger so as to evaporate the water and generate a heated fuel mixture including the natural gas and simulated air. Further, the syngas production system includes an engine, for example, an internal combustion engine, to partially combust the heated fuel mixture to generate the syngas. The hydrogen to carbon monoxide molar ratio in the syngas (may also be referred to "a quality of the syngas") produced from the engine may be increased by increasing fuel to oxygen ratio and maintaining a predefined concentration of steam in the fuel mixture. During combustion of the fuel mixture, the presence of steam improves the ratio of hydrogen to carbon monoxide molar ratio in the syngas. The combustion temperature and heat released from partial combustion of the heated fuel mixture may be efficiently regulated by a) varying fuel to oxygen ratio, b) varying the quantity of oxidant and steam in the simulated air and c) varying the temperature of the heated fuel mixture injected to the engine. The conventional way of injecting water directly to the engine to increase the hydrogen content in the syngas may drastically vary the combustion temperature of the engine resulting in an unstable operating condition.

Figure 1:
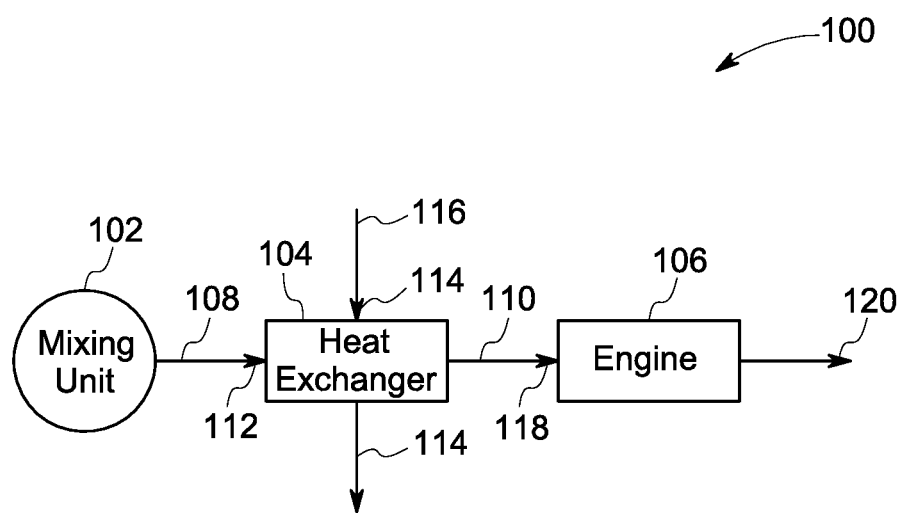
FIG. 1 is a block diagram of a syngas production system in accordance with one exemplary embodiment.

FIG. 1 illustrates a block diagram of a system 100, for example, a syngas production system in accordance with one exemplary embodiment. The syngas production system 100 includes a mixing unit 102, a heat exchanger 104, and an engine 106. The mixing unit 102 is coupled to the heat exchanger 104 via a channel 108. The engine 106 is coupled to the heat exchanger 104 via an intake manifold 110.

The mixing unit 102 is configured to mix a hydrocarbon fuel, an oxidant, and water and generate a fuel mixture 112.

In one embodiment, the hydrocarbon fuel is natural gas such as methane. In some other embodiments, the hydrocarbon fuel may include refinery gas, landfill gas, associated petroleum gas, and the like. Similarly, the oxidant is enriched oxygen having a substantially low percentage of other components such as nitrogen and the like. In certain embodiments, the oxidant includes a mixture of oxygen and nitrogen. In such embodiments, an amount of oxygen in the oxidant is in a range of 50 percent to 95 percent.

The fuel mixture 112 may be a moist fuel mixture having a pre-defined ratio of fuels, for example, 40 to 60 percent of methane, 30 to 40 percent of oxidant, and 10 to 20 percent of water. In one or more embodiments, the pre-defined ratio of the fuels in the fuel mixture 112 may be varied based on an operating condition of the heat exchanger 104 and the engine 106. In one or more embodiments, a control unit (not shown) may be used to control the feed of fuels to the mixing unit 102 to vary the pre-defined ratio of the fuels.

The heat exchanger 104 is configured to receive the fuel mixture 112 from the mixing unit 102 via the channel 108. Further, the heat exchanger 104 is configured to receive a hot fluid 114 via a manifold 116 (may also be referred to "an exhaust manifold"). In one embodiment, the heat exchanger 104 is a shell and tube heat exchanger. In such embodiments, the heat exchanger 104 may include a bundle of tubes (not shown in FIG. 1) disposed within a chamber (not shown in FIG. 1). The bundle of tubes is coupled to the channel 108 and the chamber is coupled to the manifold 116. The chamber is configured to receive the hot fluid 114 from the manifold 116 and heat the fuel mixture 112 circulated within the bundle of tubes to evaporate the water content (i.e. vaporize the water to produce steam) of the fuel mixture 112 and generate a heated fuel mixture 118. In one embodiment, the hot fluid 114 is an exhaust syngas which is generated from the engine 106. In some other embodiments, the hot fluid 114 may be a flue gas or exhaust gas generated or received from a furnace, a boiler, a steam generator, and the like. In one embodiment, the heated fuel mixture 118 is maintained at a temperature range from 100 to 220 degrees Celsius. The pressure of the heated fuel mixture 118 may be in a range from 1 to 10 bars. In one specific embodiment, the heated fuel mixture 118 is a mixture of the hydrocarbon fuel and simulated air. The term "simulated air" refers to a mixture of the oxidant and steam. In certain embodiments, the simulated air may additionally include nitrogen.

The engine 106 is configured to receive the heated fuel mixture 118 via the intake manifold 110. In one embodiment, the engine 106 is an internal combustion engine, for example, a spark ignition engine configured to generate an exhaust syngas 120. The engine 106 is configured to compress the heated fuel mixture 118 during a compression stroke and ignite the compressed heated fuel mixture 118 during a power stroke to partially combust the heated fuel mixture 118 and generate the exhaust syngas 120. Partial combustion refers to fractional combustion of the hydrocarbon fuel such as methane in presence of relatively small amount of oxidant. In certain embodiments, the ratio of the oxidant in the heated fuel mixture 118 may be regulated to prevent complete combustion (i.e. oxidation) of the hydrocarbon fuel in the heated fuel mixture 118, thereby, preventing formation of high percentage of carbon dioxide.

In one or more embodiments, the fuel mixture 112 generated from the mixing unit 102, is a diluted fuel mixture. As a result, a temperature of the engine 106 and heat released from the heated fuel mixture 118 are controlled during the combustion of the fuel mixture 112. Hence, a stable operating condition for the engine 106 is generated. Further, the presence of steam in the heated fuel mixture 118 may increase the hydrogen content in the exhaust syngas 120 by water gas shift reaction of the heated fuel mixture 118, thereby improving the hydrogen to carbon monoxide molar ratio in the exhaust syngas 120.

Figure 2:
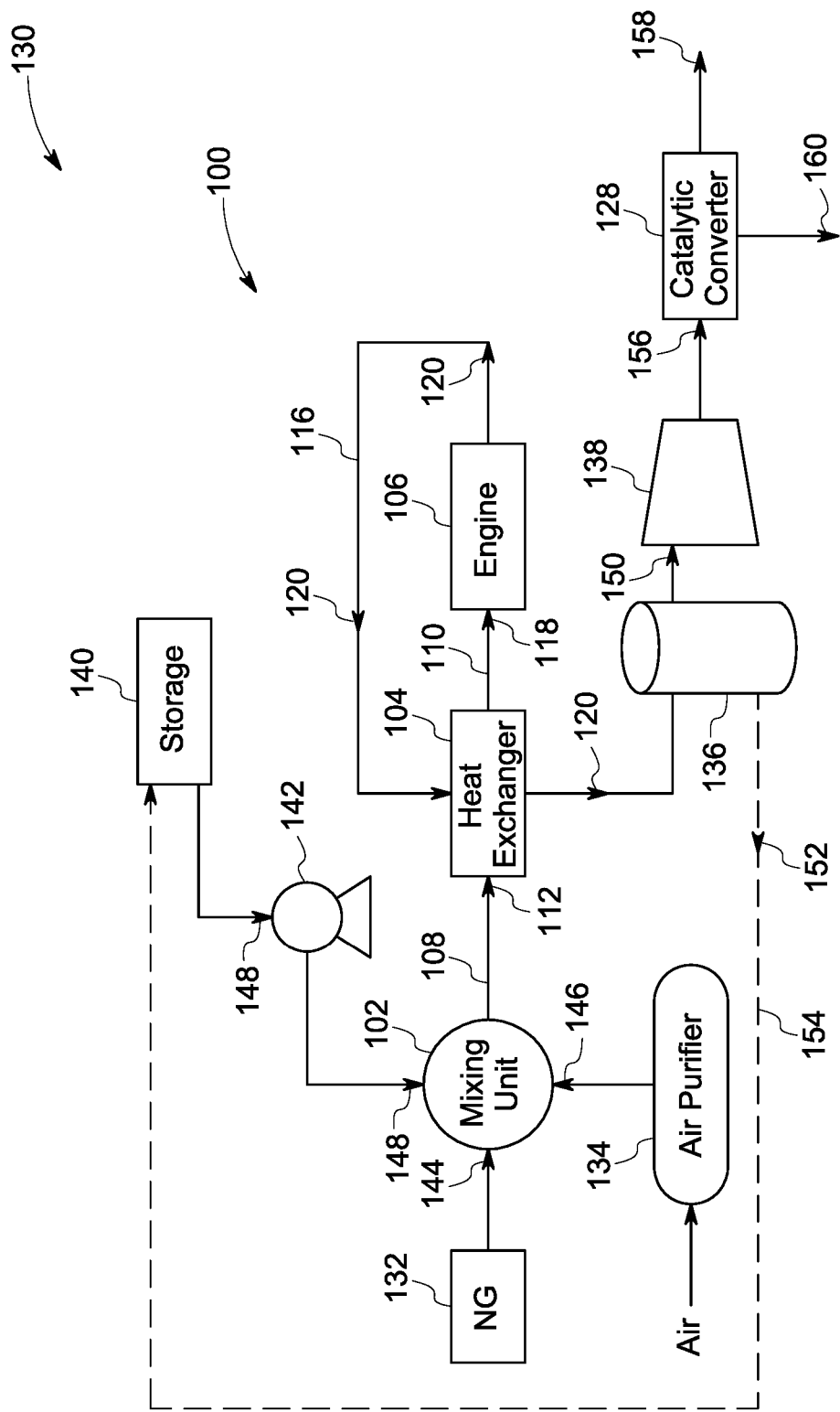
FIG. 2 is a block diagram of a fuel conversion system including a syngas production system in accordance with one exemplary embodiment.

FIG. 2 illustrates a fuel conversion system 130 including the syngas production system 100 and a catalytic converter 128 in accordance with one exemplary embodiment.

As discussed previously, the syngas production system 100 includes the mixing unit 102, the heat exchanger 104, and the engine 106. The syngas production system 100 further includes a hydrocarbon fuel source 132, an air purifier 134, a condenser 136, a compressor 138, a water storage unit 140, and a pump 142.

The mixing unit 102 is coupled to the hydrocarbon fuel source 132, the air purifier 134, and the pump 142. The hydrocarbon fuel source 132 may be a storage unit configured to store a hydrocarbon fuel 144 such as methane. The hydrocarbon fuel source 132 is configured to feed the hydrocarbon fuel 144 to the mixing unit 102. The air purifier 134 is configured to receive air and separate an oxidant 146 from the air. In certain embodiments, the oxidant 146 is enriched oxygen having a relatively small percentage of other components such as nitrogen and the like. The air purifier 134 is further configured to feed the oxidant 146 to the mixing unit 102. The pump 142 is further coupled to the water storage unit 140 and configured to feed water 148 to the mixing unit 102. In one embodiment, the mixing unit 102 is a batch processing device which is configured to receive the pre-defined ratio of the hydrocarbon fuel 144, the oxidant 146, and the water 148 and produce the fuel mixture 112. In certain other embodiments, the mixing unit 102 is a continuous processing device which is configured to continuously receive the pre-defined ratio of the hydrocarbon fuel 144, the oxidant 146, and the water 148 and produce the fuel mixture 112. In some embodiments, an amount of the hydrocarbon fuel 144 in the fuel mixture 112 exceeds a stoichiometric amount of the hydrocarbon fuel 144 in a range of 2 to 4. In one embodiment, a stoichiometric molar ratio of the hydrocarbon fuel 144 to the oxidant 146 is 1:2. In such embodiments, the fuel mixture 112 may undergo complete combustion (i.e. oxidation), thereby producing carbon dioxide and hydrogen. In order to prevent complete combustion, the stoichiometric molar ratio of the hydrocarbon fuel 144 to the oxidant 146 is maintained in range from 2:2 to 4:2 so as to partially combust the fuel mixture 112 to generate the syngas. Similarly, in some other embodiments, an amount of the water 148 in the fuel mixture 112 is within a range of 10 percent to 30 percent.

As discussed previously in the embodiment of FIG. 1, the heat exchanger 104 is configured to receive the fuel mixture 112 from the mixing unit 102 via the channel 108 and the exhaust syngas 120 from the engine 106 via the exhaust manifold 116. Further, the heat exchanger 104 is configured to evaporate the water 148 by heating the fuel mixture 112, using the exhaust syngas 120, to generate the heated fuel mixture 118. In one embodiment, the heat exchanger 104 is configured to heat the fuel mixture 112 to a temperature in a range from 50 degrees Celsius to 200 degrees Celsius prior to partially combusting the heated fuel mixture 118 in the engine 106. The engine 106 is configured to receive the heated fuel mixture 118 from the heat exchanger 104 via the intake manifold 110. Further, the engine 106 is configured to partially combust the heated fuel mixture 118 to generate the exhaust syngas 120. In one embodiment, the exhaust syngas 120 includes the molar ratio of 2:1 of hydrogen and carbon monoxide. In some other embodiments, the exhaust syngas 120 may include the molar ratio from 1.6:1 to 4:1 of hydrogen and carbon monoxide.

The engine 106 is coupled to the condenser 136 via the exhaust manifold 116. Specifically, the exhaust manifold 116 extends from the engine 106 to the condenser 136 through the heat exchanger 104. The exhaust syngas 120 heats the fuel mixture 112 in the heat exchanger 104 before being fed to the condenser 136. In some embodiments, the exhaust syngas 120 may be further cooled in an air cooler before being fed to the condenser 136.

The condenser 136 is configured to receive a cooled exhaust syngas 120 from the engine 106 via the exhaust manifold 116. The condenser 136 is configured to generate a separated syngas 150 and condensed water 152 from the exhaust syngas 120 by a condensation process. The condenser 136 is further coupled to the compressor 138 and configured to feed the separated syngas 150 to the compressor 138. The condenser 136 is also coupled to the water storage unit 140 via a recirculation channel 154. The condenser 136 is further configured to feed the condensed water 152 to the water storage unit 140. The water storage unit 140 is coupled to the mixing unit 102 via the pump 142. The pump 142 is configured to pump the water 148 from the water storage unit 140 to the mixing unit 102.

The compressor 138 is configured to receive the separated syngas 150 from the condenser 136 and compresses the separated syngas 150 to produce a pressurized separated syngas 156. In the illustrated embodiment, the compressor 138 is not directly coupled to the engine 106. The compressor 138 is coupled to the engine 106 via the condenser 136. In such a configuration, the compressor 138 may perform relatively small amount of work because the compression process involves compressing only the separated syngas 150 and not the exhaust syngas 120 including the condensed water 152.

The catalytic converter 128 is coupled to the compressor 138 and configured to receive the pressurized separated syngas 156 from the compressor 138. In one embodiment, the catalytic converter 128 is a fischer-tropsch converter. The catalytic converter 128 is configured to perform a plurality of catalytic reactions to convert the pressurized separated syngas 156 having carbon monoxide and hydrogen to a liquid fuel 158 and a tail gas 160. In some embodiments, the liquid fuel 158 includes liquid hydrocarbons such as gasoline, diesel, methanol, naphtha, paraffin, and the like and the tail gas 160 includes lighter hydrocarbons.

Figure 3:
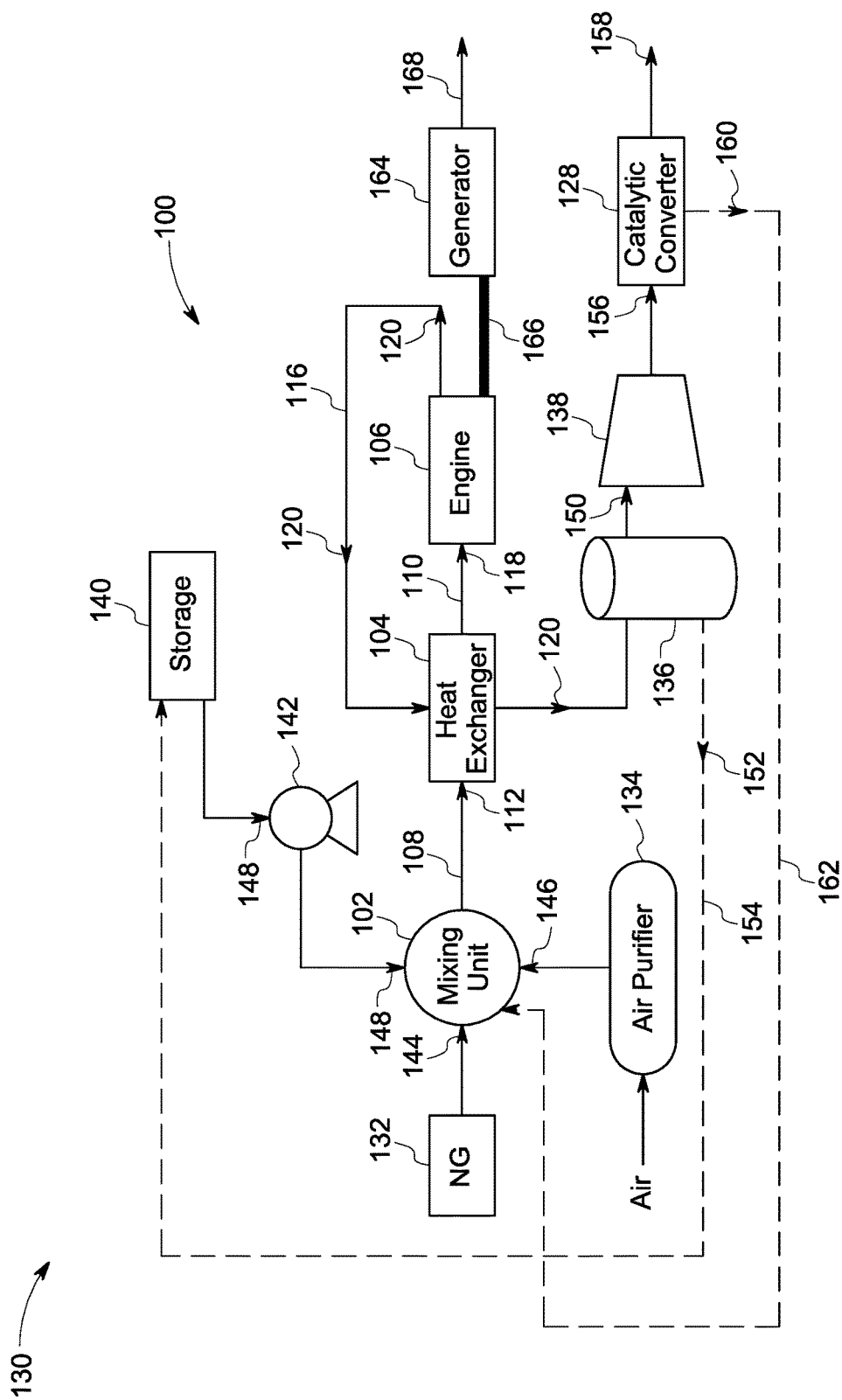
FIG. 3 is a block diagram of a fuel conversion system including a generator and a recirculation channel in accordance with one exemplary embodiment.

FIG. 3 illustrates a block diagram of fuel conversion system 130 including a generator 164 and a recirculation channel 162 in accordance with one exemplary embodiment.

In the illustrated embodiment, the syngas production system 100 additionally includes the recirculation channel 162 extending from the catalytic converter 128 to the mixing unit 102. The recirculation channel 162 is configured to feed at least a portion of the tail gas 160 containing hydrocarbons from the catalytic converter 128 to the mixing unit 102. The mixing unit 102 is configured to mix at least a portion of the tail gas 160 with the hydrocarbon fuel 144, the oxidant 146, and the water 148 to generate the fuel mixture 112. In some embodiments, the tail gas 160 may be compressed before feeding into the mixing unit 102.

The syngas production system 100 further includes the generator 164 coupled to the engine 106 via a shaft 166. The combustion of the heated fuel mixture 118 during a power stroke of the engine 106 drives the generator 164 via the shaft 166 to produce electric power 168.

Figure 4:
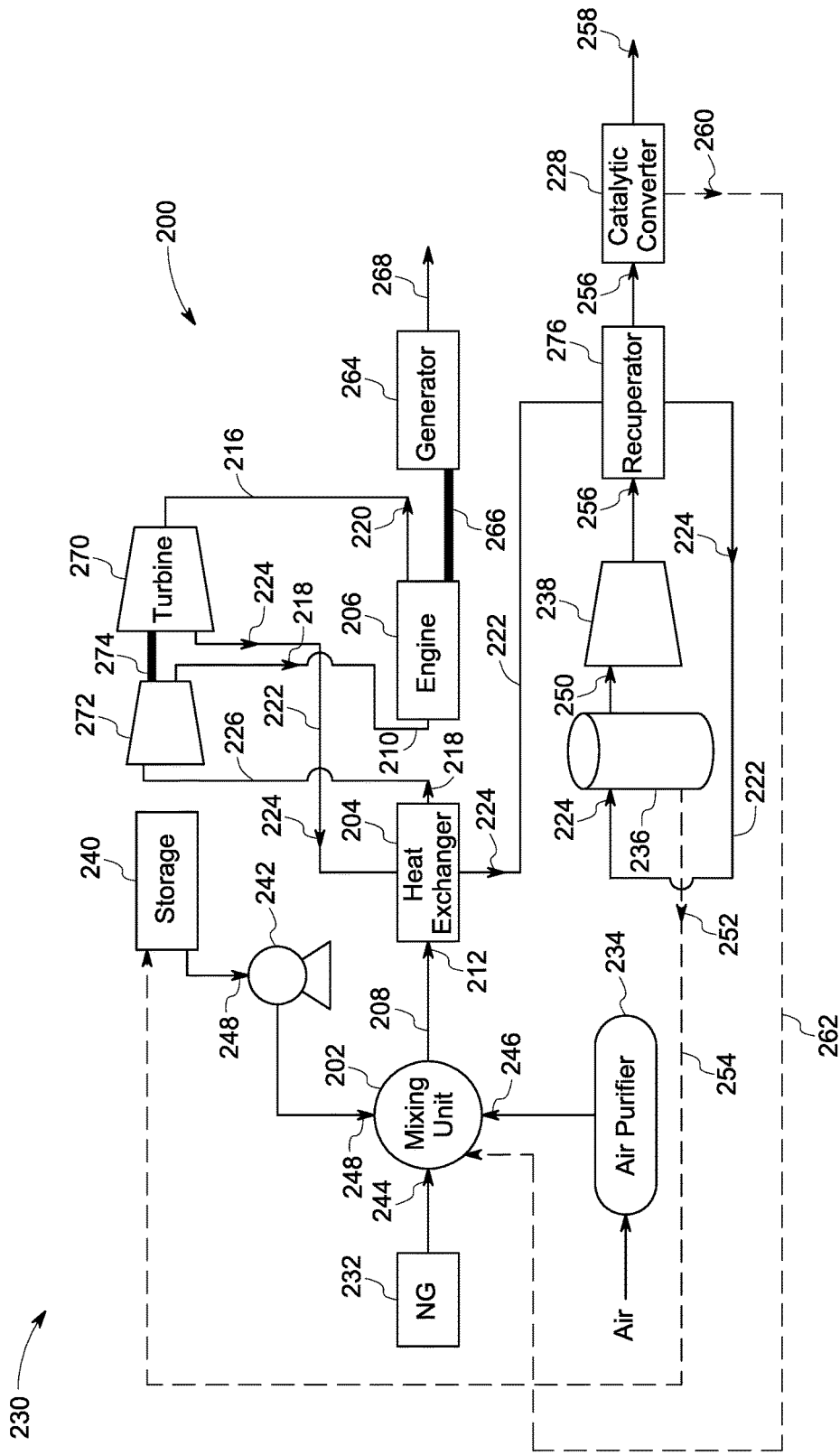
FIG. 4 is a block diagram of a fuel conversion system in accordance with another exemplary embodiment.

FIG. 4 illustrates a block diagram of a fuel conversion system 230 in accordance with another exemplary embodiment. In the illustrated exemplary embodiment, the fuel conversion system 230 includes a syngas production system 200 and a catalytic converter 228. The syngas production system 200 includes a mixing unit 202, a heat exchanger 204, an engine 206, a hydrocarbon fuel source 232, an air purifier 234, a condenser 236, a first compressor 238, a water storage unit 240, a pump 242, a turbine 270, a generator 264, and a second compressor 272.

In the illustrated embodiment, the mixing unit 202 is coupled to the heat exchanger 204 via a channel 208. The heat exchanger 204 is coupled to the second compressor 272 via an intake channel 226. The second compressor 272 is coupled to the engine 206 via an intake manifold 210. The engine 206 is coupled to the turbine 270 via a first exhaust manifold 216. The turbine 270 is coupled to the condenser 236 via a second exhaust manifold 222. In such a configuration, the second exhaust manifold 222 extends from the turbine 270 to the condenser 236 via the heat exchanger 204 and a recuperator 276.

Further, the mixing unit 202 is coupled to the hydrocarbon fuel source 232, the air purifier 234, the pump 242, and a catalytic converter 228. The mixing unit 202 is configured to receive i) a hydrocarbon fuel 244 from the hydrocarbon fuel source 232 ii) an oxidant 246 from the air purifier 234 iii). water 248 from the pump 242 and iv) a tail gas 260 from the catalytic converter 228. The mixing unit 202 is configured to mix the hydrocarbon fuel 244, the oxidant 246, the water 248, and the tail gas 260 to generate a fuel mixture 212.

The heat exchanger 204 is configured to receive the fuel mixture 212 from the mixing unit 202 via the channel 208. Further, the heat exchanger 204 is configured to receive an expanded exhaust syngas 224 (also referred to herein as "a hot fluid") from the turbine 270 via the second exhaust manifold 222. The heat exchanger 204 is further configured to evaporate the water 248 from the fuel mixture 212 by heating the fuel mixture 212, using the expanded exhaust syngas 224, to generate a heated fuel mixture 218. In one embodiment, the heated fuel mixture 218 is a mixture of the hydrocarbon fuel 244 and simulated air. The "simulated air" refers to mixture of the oxidant 246 and steam. In certain embodiments, the simulated air may additionally include nitrogen.

The second compressor 272 is configured to receive the heated fuel mixture 218 from the heat exchanger 204 and compress the heated fuel mixture 218 before feeding the heated fuel mixture 218 to the engine 206. In one embodiment, the second compressor 272 is configured to compress the heated fuel mixture 218 in a pressure ranging from 2 bars to 8 bars.

The engine 206 is configured to receive the heated fuel mixture 218 from the second compressor 272 and partially combust the heated fuel mixture 218 to generate the exhaust syngas 220. The usage of simulated air in the heated fuel mixture 218 increases the hydrogen to carbon monoxide molar ratio in the exhaust syngas 220 produced from the engine 206 and also facilitates to provide a stable operating condition of the engine 206. The engine 206 is further coupled to the generator 264 via a shaft 266. In such a configuration, the generator 264 is driven by the engine 206 via the shaft 266 to produce electric power.

The turbine 270 is configured to receive the exhaust syngas 220 from the engine 206 and expand the exhaust syngas 220 to produce the expanded exhaust syngas 224. The turbine 270 is further coupled to the second compressor 272 via a shaft 274. In such a configuration, the turbine 270 is configured to drive the second compressor 272 via the shaft 274.

The expanded exhaust syngas 224 (i.e. hot fluid) is transferred in heat exchange relationship with the fuel mixture 212 in the heat exchanger 204 to generate the heated fuel mixture 218. The recuperator 276 is further coupled to the first compressor 238 and the catalytic converter 228. The recuperator 276 is configured to receive a pressurized separated syngas 256 from the first compressor 238. The expanded exhaust syngas 224 is further circulated in heat exchange relationship with the pressurized separated syngas 256 in the recuperator 276, to increase the temperature of the pressurized separated syngas 256.

The condenser 236 is configured to receive the expanded exhaust syngas 224 from the turbine 270 and generate a separated syngas 250 and condensed water 252 from the expanded exhaust syngas 224 by condensation process. The condenser 236 is further coupled to the water storage unit 240 via a recirculation channel 254. In the illustrated embodiment, the water storage unit 240 is further coupled to the mixing unit 202 via the pump 242. The condenser 236 is configured to feed the condensed water 252 to the water storage unit 240. The pump 242 is configured to feed the condensed water 252 from the water storage unit 240 to the mixing unit 202.

The first compressor 238 is coupled to the condenser 236 and the recuperator 276. The first compressor 238 is configured to receive the separated syngas 250 from the condenser 236 and compress the separated syngas 250 to generate the pressurized separated syngas 256.

The recuperator 276 is further coupled to the catalytic converter 228. The recuperator 276 is configured to receive the pressurized separated syngas 256 from the first compressor 238 and heat the pressurized separated syngas 256 using the expanded exhaust syngas 224. Specifically, the recuperator 276 is configured to increase the temperature of the pressurized separated syngas 256 to suit the subsequent catalytic converter process.

The catalytic converter 228 is configured to receive the heated pressurized separated syngas 256 from the recuperator 276. In one embodiment, the catalytic converter 228 is a fischer-tropsch converter. The catalytic converter 228 is configured to perform a plurality of catalytic reactions to convert the pressurized separated syngas 256 having carbon monoxide and hydrogen to a liquid fuel 258 and a tail gas 260. In some embodiments, the liquid fuel 258 includes liquid hydrocarbons such as gasoline, diesel, methanol, naphtha, paraffin, and the like and the tail gas 260 includes light hydrocarbons. The catalytic converter 228 is further coupled to the mixing unit 202 via a recirculation channel 262 and configured to feed at least a portion of the tail gas 260 to the mixing unit 202 to generate the fuel mixture 212. In certain embodiments, a plurality of additional steps, such as purification of the separated syngas 256 may be performed before supplying the separated syngas 256 to the catalytic converter 228 to avoid degradation and poisoning of the catalyst used in the catalytic converter 228.

In accordance with one or more embodiments discussed herein, an exemplary syngas gas production system is configured to improve hydrogen to carbon monoxide molar ratio in an exhaust syngas. Further, usage of the simulated air in the heated fuel mixture facilitates to control the combustion temperature and the heat released from the heated fuel mixture.

In one embodiment, a model (not shown) is used to simulate syngas production using an engine such as an internal combustion engine. The engine may produce a nominal power of 10 MW and release heat of 21 MW at nominal operating conditions. It is assumed that a total volume flow of fuel mixture to the engine during fuel-rich combustion was substantially same as in the nominal case.

The syngas production model may include inlet streams of oxidant, methane, and water to the mixing unit. The oxidant includes oxygen content of 95 percent and other constituents, such as nitrogen of 5 percent. The oxidant may be compressed, using a compressor to a pressure of 3 to 6 bars prior to feeding to the mixing unit. The methane injected to the mixing unit may be at a pressure of up to 6 bars. The mixing unit is configured to mix the oxidant, methane, and water to generate a fuel mixture. In such embodiments, the syngas production model may additionally include a compression unit disposed downstream of the mixing unit to maintain the pressure of the fuel mixture at up to 6 bars before feeding the fuel mixture from the mixing unit to the engine.

The syngas production model may further include a volume flow-adjust unit disposed downstream of mixing unit and configured to ensure that a volume flow of the fuel mixture is maintained at a referenced volume flow rate. In one embodiment, the referenced volume flow rate of methane to oxidant is maintained at a stoichiometric molar ratio of 3:1 so as to partially combust such a fuel mixture in the engine. The volume flow-adjusting unit is configured to adjust the volume flow of oxidant and methane accordingly, thereby maintaining a desired excess oxidant to methane ratio.

The fuel mixture is then heated in a heat exchanger to evaporate the water in the fuel mixture to generate a heated fuel mixture. The amount of water in the fuel mixture is maintained at 10 percent. In one embodiment, the heat exchanger is configured to heat the fuel mixture at 130 degrees Celsius, using the exhaust syngas, to evaporate the water. The engine is configured to receive the heated fuel mixture and partially combust the heated fuel mixture to generate an exhaust syngas.

Figure 5:
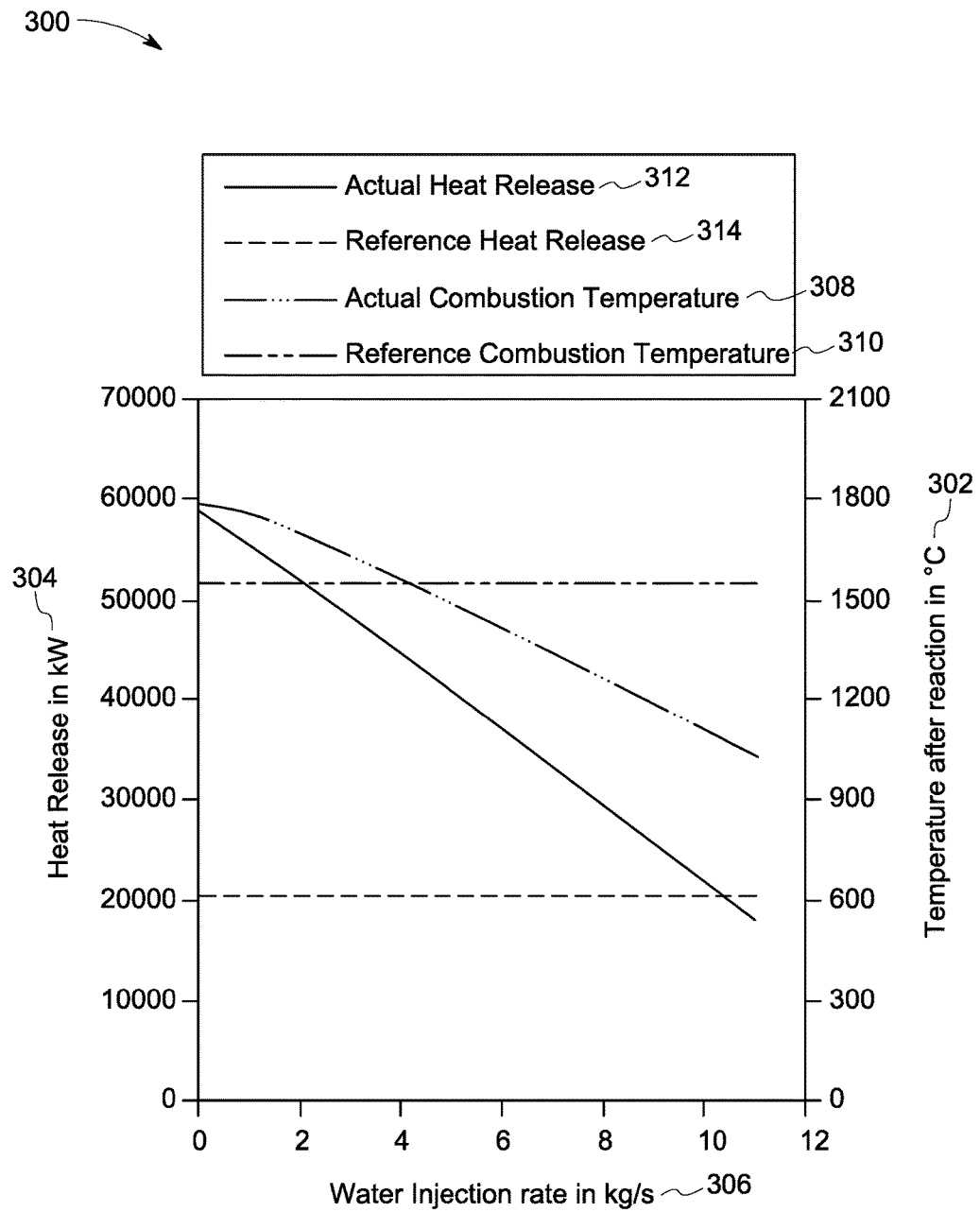
FIG. 5 shows a graph representative of variation in combustion temperature, heat release, and a water injection rate in accordance with one exemplary embodiment.

FIG. 5 shows a graph 300 representative of variation in combustion temperature 302 (i.e. temperature after reaction), heat release 304, and a water injection rate 306. The combustion temperature 302 and the heat release 304 are represented by y-axis and the water injection rate 306 is represented by x-axis. If "phi"=2.5 (where "phi" is defined as stoichiometric molar ratio of methane to oxidant) and a water injection rate 306 is 4 kg/s, then an actual combustion temperature 308 is equal to a referenced combustion temperature 310. Further, for such a condition, an actual heat release 312 exceeds referenced heat release 314 by a factor of 2.5. It is assumed that maintaining the referenced heat release 314 from the engine may have least impact on the engine performance In order to maintain the referenced heat release 314, the required amount of steam to be injected to the engine may have to be adjusted. Thus, water may be injected to the mixing unit either immediately after the compression of oxidant or after mixing of oxidant and methane in the mixing unit. In such conditions, mixing of the water with the compressed oxidant is preferred than mixing methane with a substantially pure form of oxidant and then mixing with water. The heat exchanger may later be used to increase the temperature of the oxidant and steam, such that no water droplets are formed while injecting the fuel mixture to the engine.

Thus, it may be observed from the graph 300 that the referenced combustion temperature 310 may be equal to the actual combustion temperature 308 at water injection rate 306 of 4 kg/s. Similarly, the referenced heat release 314 may be equal to the actual heat release 312 at water injection rate 306 of 10 kg/s.

Figure 6:
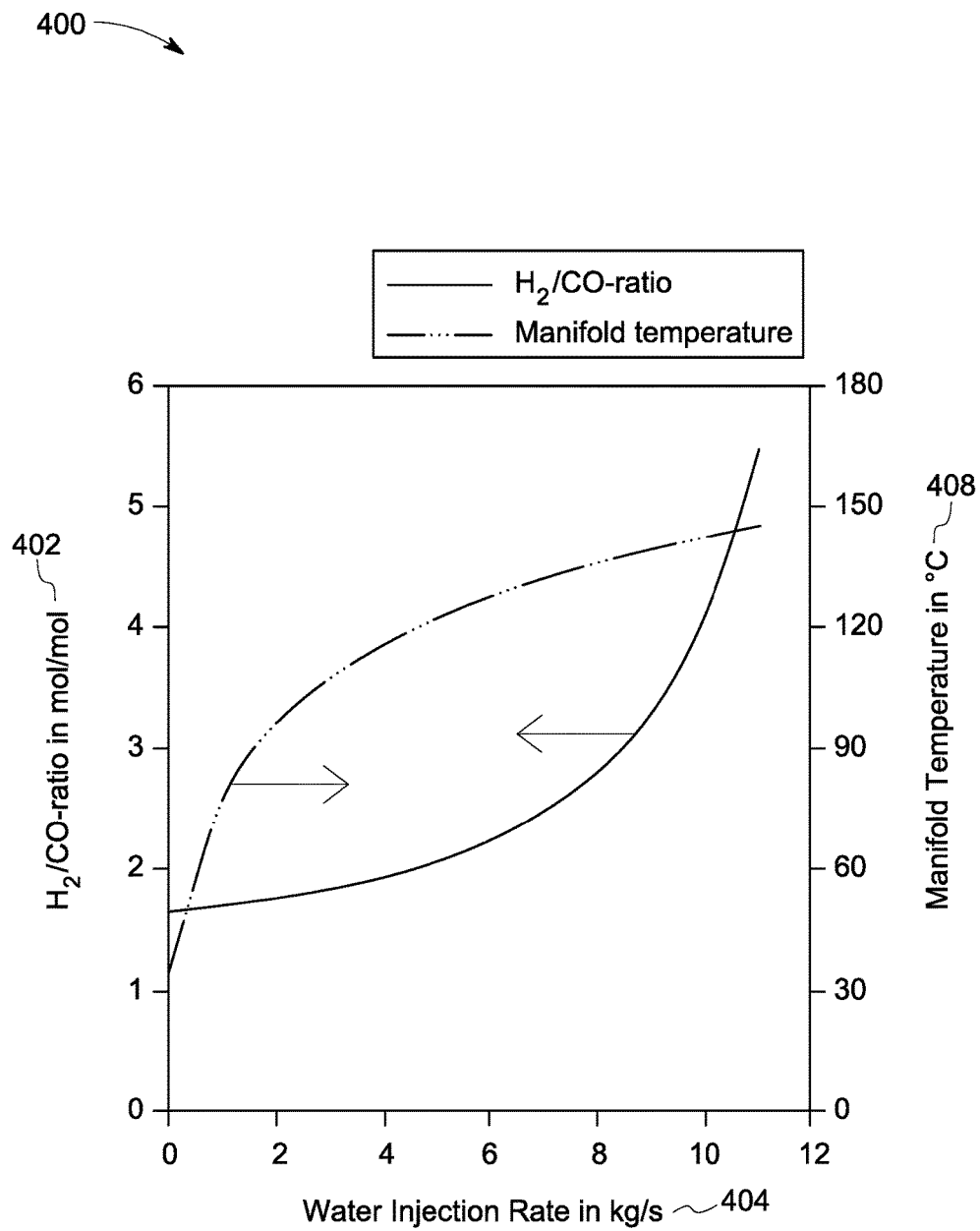
FIG. 6 shows a graph representative of variation in hydrogen to carbon monoxide molar ratio, manifold temperature, and a water injection rate in accordance with one exemplary embodiment.

FIG. 6 shows a graph 400 representative of variation in hydrogen to carbon monoxide molar ratio 402, and a manifold temperature 408, and a water injection rate 404. The hydrogen to carbon monoxide molar ratio 402 and the manifold temperature 408 are represented by a y-axis and the water injection rate 404 is represented by an x-axis. In certain embodiments, at a water injection rate 404 of 4 kg/s, a significant volume of syngas is produced (i.e. 22,000 Nm3/h) and the hydrogen to carbon monoxide molar ratio 402 is 2:3 which is higher than the optimum hydrogen to carbon monoxide molar ratio of 2:1.

The manifold temperature 408 is considerably increased from 50 degrees Celsius to 130 degrees Celsius, to prevent condensation of steam in the heated fuel mixture. Such a manifold temperature 408 is below a temperature range at which one or more components of the engine may be damaged. Further, it is determined that to evaporate the water in the fuel mixture, a significant amount of heat is required, which may be estimated to 10 MW. Further estimates show that engine exhaust (i.e. exhaust syngas) may include significant heat to evaporate the water in the fuel mixture. Engine exhaust is used in the heat exchanger to evaporate water in the fuel mixture, thereby enabling to maintain the temperature of the heated fuel mixture at the engine inlet (i.e. at manifold) at a desired value. Hence, syngas production process is more energy efficient and self-sufficient.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. A system comprising:
  a mixing unit configured to mix a hydrocarbon fuel, an oxidant, and water to generate a fuel mixture;
  a heat exchanger coupled to the mixing unit and configured to receive the fuel mixture and evaporate the water by heating the fuel mixture, using a hot fluid, to generate a heated fuel mixture;
  an engine coupled to the heat exchanger and configured to receive the heated fuel mixture and generate an exhaust syngas by partially combusting the heated fuel mixture;
  a turbine coupled to the engine through a first exhaust manifold;
  a condenser coupled to the turbine through a second exhaust manifold, wherein the condenser is configured to receive an expanded exhaust syngas stream from the turbine through the second exhaust manifold and generate a separated syngas stream and condensed water from the expanded exhaust syngas by a condensation process;
  a compressor coupled to the condenser and configured to compress the separated syngas stream to produce a pressurized separated syngas;
  a catalytic converter coupled to the compressor and configured to receive the pressurized separated syngas from the compressor;
  a recuperator coupled to the compressor and the catalytic converter, wherein the second exhaust manifold extends from the turbine to the condenser through the heat exchanger and the recuperator, wherein the second exhaust manifold is configured to transfer the exhaust syngas in a heat exchange relationship with the fuel mixture in the heat exchanger, wherein the second exhaust manifold is further configured to transfer the exhaust syngas in a heat exchange relationship with the pressurized separated syngas in the recuperator;
  and wherein the recuperator is positioned upstream of the catalytic converter.

2. The system of claim 1, further comprising a recirculation channel coupled to the condenser and the mixing unit, wherein the recirculation channel is configured to recirculate the condensed water from the condenser to the mixing unit to generate the fuel mixture.

3. The system of claim 1, wherein the exhaust manifold extends from the engine to the condenser through the heat exchanger, wherein the exhaust manifold is configured to transfer the exhaust syngas in heat exchange relationship with the fuel mixture.

4. The system of claim 1, further comprising a recirculation channel coupled to the catalytic converter and the mixing unit, wherein the recirculation channel is configured to circulate a portion of the tail gas from the catalytic converter to the mixing unit to generate the fuel mixture.

5. The system of claim 1, further wherein the turbine is configured to receive the exhaust syngas from the engine through the first exhaust manifold and expand the exhaust syngas to produce an expanded exhaust syngas.

6. The system of claim 1, wherein the catalytic converter is configured to generate a liquid fuel and a tail gas from the pressurized separated syngas by a catalytic reaction.

7. The system of claim 5, further comprising a second compressor coupled to the heat exchanger and the engine, wherein the second compressor is configured to be driven by the turbine via a shaft, and wherein the second compressor is configured to receive the heated fuel mixture from the mixing unit and compress the heated fuel mixture before feeding the heated fuel mixture to the engine.

8. A method comprising:
  mixing a hydrocarbon fuel, an oxidant, and water in a mixing unit, to generate a fuel mixture;
  evaporating the water by heating the fuel mixture, using a hot fluid in a heat exchanger, to generate a heated fuel mixture;
  generating an exhaust syngas by partially combusting the heated fuel mixture in an engine;
  receiving the exhaust syngas from the engine into a turbine via a first exhaust manifold;
  expanding the exhaust syngas in the turbine to produce an expanded exhaust syngas;
  transferring the expanded exhaust syngas from the turbine to a condenser via a second exhaust manifold;
  generating a separated syngas and condensed water from the expanded exhaust syngas in the condenser by a condensation process;
  compressing the separated syngas in a compressor, to produce a pressurized separated syngas;
  generating a liquid fuel and a tail gas from the pressurized separated syngas in a catalytic converter, by a catalytic reaction;
  transferring a hot fluid from the turbine to the condenser via the heat exchanger and a recuperator coupled to the compressor and the catalytic converter, wherein the hot fluid is transferred in a heat exchange relationship with the fuel mixture in the heat exchanger to heat the fuel mixture, wherein the hot fluid is further transferred in a heat exchange relationship with the pressurized separated syngas in the recuperator, and wherein the hot fluid comprises the expanded exhaust syngas, and wherein the recuperator is positioned upstream of the catalytic converter.

9. The method of claim 8, further comprising receiving the heated fuel mixture from the mixing unit in a second compressor and compressing the heated fuel mixture in the second compressor before feeding the heated fuel mixture to the engine, wherein the second compressor is configured to be driven by the turbine via a shaft.

* * * * *